E. E. CONRAD.
TROLLEY STOP.
APPLICATION FILED APR. 6, 1915.
1,155,214. Patented Sept. 28, 1915.
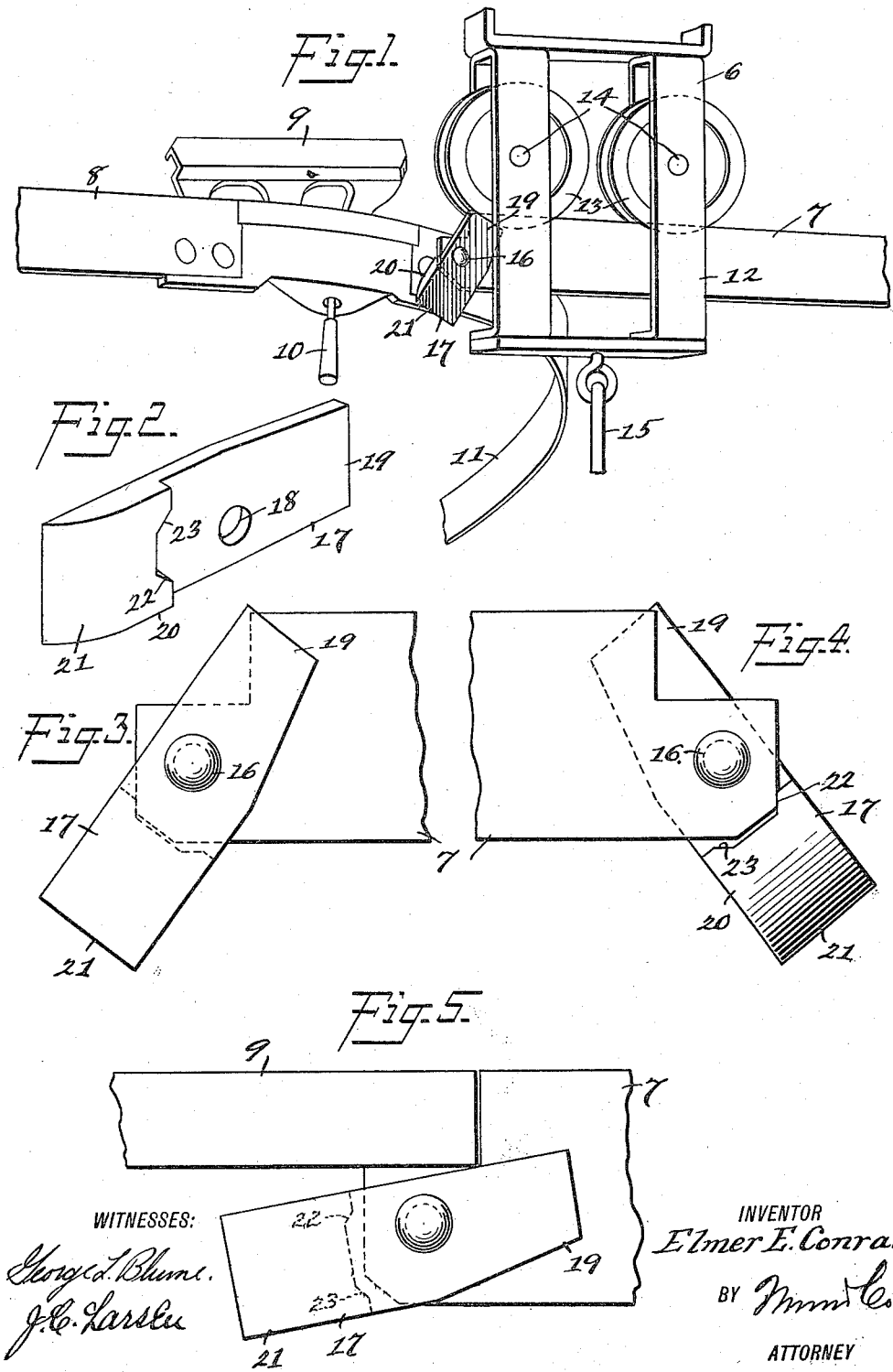
WITNESSES:
George L. Blume.
J. C. Larsen
INVENTOR
Elmer E. Conrad
BY
ATTORNEY

UNITED STATES PATENT OFFICE.

ELMER EUGENE CONRAD, OF WEST SALEM, WISCONSIN, ASSIGNOR OF ONE-HALF TO HARRY A. TULLOCH, OF GENOA, WISCONSIN.

TROLLEY-STOP.

1,155,214.           Specification of Letters Patent.      Patented Sept. 28, 1915.

Application filed April 6, 1915. Serial No. 19,603.

*To all whom it may concern:*

Be it known that I, ELMER E. CONRAD, a citizen of the United States, and a resident of West Salem, in the county of La Crosse and State of Wisconsin, have invented certain new and useful Improvements in Trolley-Stops, of which the following is a specification.

My invention relates to overhead trolley systems, of the type used in factories, canneries, packing-houses, etc., with a particular reference to the switch positions in the tracks, and one of the main objects of the invention is to provide means at an open switch for preventing the trolley from falling from the end of the track.

A further object is to provide such a stop which is entirely automatic in action, into and out of operative position, in the switch opening and closing; and further objects are to provide such stops which are simple in construction, highly efficient in operation, well adapted for the purpose for which they are designed, comparatively inexpensive, readily installed upon conventional track systems, and not likely to get out of order.

My invention is fully described in the following specification, of which the accompanying drawings form a part, in which like reference characters refer to like parts in each of the views, and in which:—

Figure 1 is a view of a trolley system with the trolley adjacent an open switch, and showing my stop in operative position; Fig. 2 is a detached view of the stop; Fig. 3 is a view of one side thereof connected with a section of track; Fig. 4 is a similar view of the opposite side thereof; and Fig. 5 is a view similar to Fig. 3 but showing the stop in inoperative position, with the switch closed.

In the drawings forming a part of this application I have shown a trolley 6 upon a track 7 adapted for connection with a track 8 by means of a switch link 9 operable by means of a handle 10 or in any other desired manner, shown removed from operative position in Fig. 1 and in operative position in Fig. 5.

The track section 8 is shown in Fig. 1 as connected with a branching track section 11, but this is merely for purposes of illustration, as is also the link 9, as my device may be used in conjunction with any sort of a breaking means in a track system.

The trolley consists of a suitable frame 12 supported by the wheels 13 at the shafts or axles 14 thereof, said wheels being double flanged in the drawings, and said frame having a dependent rod or ring 15 for attachment with the load to be conveyed from one point to another.

In the drawings I have shown the track section 7 as recessed or notched at its end to receive the switch link 9, although this is not absolutely essential, and below said notch I secure a pivot pin 16 in said track section for a stop 17 having the pivot hole 18 thereof nearer one end than the other, and closely adjacent the upper edge of said stop, in order that the outer end, by reason of its greater weight, will fall by gravity when permitted to do so, thereby raising the inner end 19 thereof into the position shown in Fig. 1.

The stop is formed with a projection 20 at the outer end 21 which forms a shoulder 22, Fig. 4, adapted to impinge on the end of the track section 7 when the stop is permitted to move into the operative position shown in Figs. 1, 3, and 4, said shoulder thus acting as limiting means against too great movement of the stop 17 in one direction, and too great movement in the other direction is prevented by a shoulder 23 on the projection 20 striking against the upper corner of the end of the track section 7.

The normal position of the stop 17 is that shown in Figs. 1, 3, and 4, because of the position of the pivot hole therein and the greater weight of the outer end 21, and this brings the inner end 19 in the path of one of the flanges on the forward wheel of an advancing trolley, thereby preventing said trolley from dropping off the track section 7.

When the switch link 9 is dropped into closing position, as shown in Fig. 5, it depresses the inner end of the stop 17 out of the path of the trolley wheels, and the trolley may move in uninterrupted manner to and over the link 9, the weight of said link maintaining said stop in this inoperative position until it is again permitted to rise to operative position when the switch is again opened.

My invention is very simple and readily installed on existing track systems without any alteration therein other than attaching the stop 17 thereto, and many accidents are prevented thereby, either to an employee or to the goods being conveyed from one point to another.

While I have shown a present preferred form of embodiment of my invention, it will be obvious that changes may be made thereover, within the scope of the following claims, without departing from the spirit of my invention or sacrificing its advantages.

Having fully described my invention, what I claim as new, and desire to secure by Letters Patent, is:—

1. The combination with an overhead track section having a notch in the upper side of the end thereof, a switch link adapted to rest in said notch and to be moved therefrom, and a trolley moving on said track section; of a stop pivoted to the side of said track section beneath said notch and normally overlapping said notch, and gravity means for insuring this stop relationship, said stop being engaged by said link in the operation of closing the switch and moved away from said notch by revolving said stop on its pivot against the action of said gravity means.

2. The combination with an overhead track section having a notch in the upper side of the end thereof, a switch link adapted to rest in said notch and to be moved therefrom, and a trolley moving on said track section; of a stop having a thickened, weighted, lower end forming shoulders, pivoted to the side of said track section beneath said notch and normally overlapping said notch, said stop being moved away from said notch by said link in the closing of said switch by being revolved on its pivot, said shoulders serving as means for limiting the degree of stop movement by striking against said track section.

In testimony whereof I have signed my name to this specification in the presence of two subscribing witnesses.

ELMER EUGENE CONRAD.

Witnesses:
B. A. MAU,
D. W. DUDLEY.

Copies of this patent may be obtained for five cents each, by addressing the " Commissioner of Patents, Washington, D. C."